Aug. 24, 1926.

L. B. CONANT 1,597,432

PROCESS OF UNITING TWO RUBBER SURFACES

Original Filed Sept. 10 1920

Inventor,
Leon B. Conant,
By
A. B. Upham
Attorney.

Patented Aug. 24, 1926.

1,597,432

UNITED STATES PATENT OFFICE.

LEON B. CONANT, OF CAMBRIDGE, MASSACHUSETTS.

PROCESS OF UNITING TWO RUBBER SURFACES.

Application filed September 10, 1920, Serial No. 409,398. Renewed March 17, 1926.

This invention has for its object the effecting of an improved method for molding treads on tires, heel and sole treads for boots and shoes, and elsewhere in which it is desired to have wear receiving portions capable of being readily removed, and yet held in place sufficiently secure for all ordinary use.

In carrying my process into effect I introduce between the surfaces to be molded together a membrane or flatly extended element adapted to prevent the entire molding together of the two surfaces, permitting only enough cohesion to give a practically sufficient attachment, but not enough to prevent the tread from being stripped off when desired.

Figure 1:
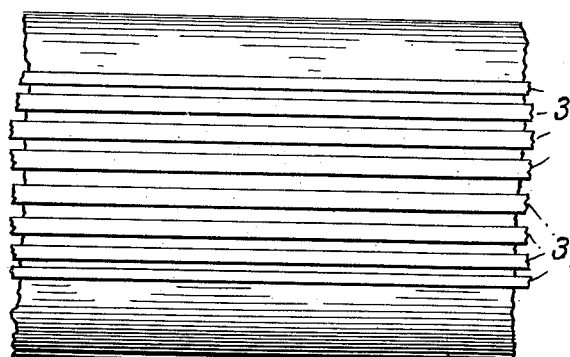
Figure 2:
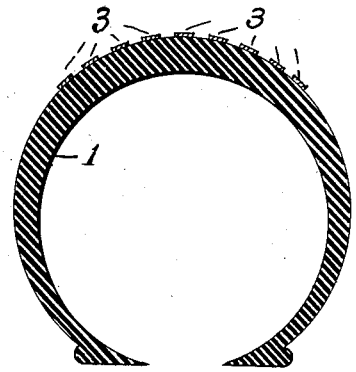
Figure 7:
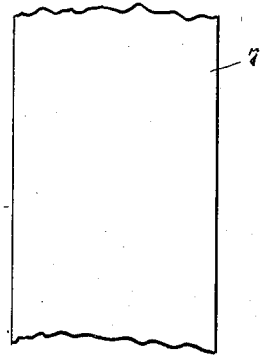
Figure 5:
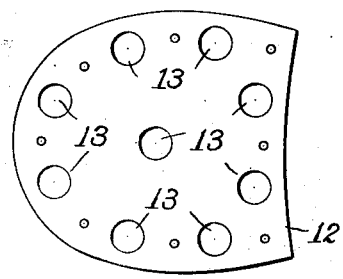
Figure 6:
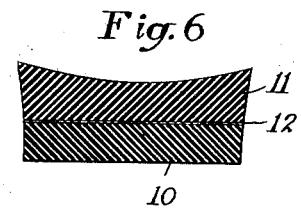
Figure 3:
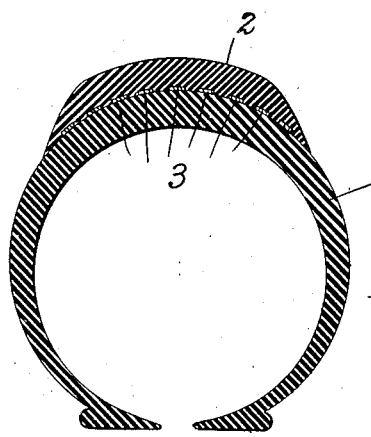
Figure 4:
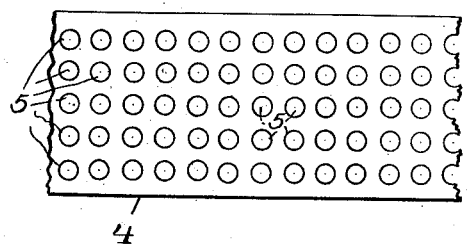

In the drawings forming part of this specification, Fig. 1 is a peripheral view of a portion of a tire after the neutralizing element has been applied thereto. Fig. 2 is a cross section of a pneumatic tire before the tread has been molded upon it. Fig. 3 is a cross section of the tire after the tread has been molded thereon. Fig. 4 is a face view of another form of the neutralizing element. Fig. 5 is a face view of a neutralizing element adapted for heels. Fig. 6 is a vertical section of a complete heel produced by my process. Fig. 7 is a face view of another neutralizing element.

I will first describe the process as applied to tires composed of rubber, and especially to those known as pneumatic tires. These tires 1 are provided with extra thicknesses of rubber about their peripheries to form a wear resisting tread 2, usually composed of solid rubber, whereas the tire itself is built up of rubber and fabric, the whole being solidly vulcanized together.

To enable such treads to be removed from the tire when worn, for the substitution of a fresh one, without the aid of machinery, without injury to the tire, and by hand alone, I introduce between the tread and tire any one of several different forms of neutralizer. That illustrated in Figs. 1, 2 and 3 consists of several thin narrow strips 3 preferably composed of fibre board. In applying them to the periphery of the tread 1, they are first processed in contact with some form of adhesive material, but preferably rubber composition, in order that they shall remain in place upon the tire during the remainder of the process. Each strip 3 preferably passes entirely about the periphery of the tire, being cut to have its ends come somewhat close together.

Then the tread 2 is put in place upon the tire 1 and the neutralizing element 3; put into a mold and vulcanized together in the usual manner. Wherever rubber meets rubber along the juncture of the tread and tire, the same will be made to unite as one, but where the strips 3 intervene there will be no such cohesion. Hence by limiting the spaces between the strips 3 relative to the widths of the latter, the cohesion of tread and tire can be reduced to any desired extent, until a comparatively small exertion of muscular strength will suffice to separate the tread from the tire.

While, on many accounts, I prefer the strips 3 as a neutralizing element, a single thin sheet 4 may be used for thus separating the tread from the carcass 1, but if composed of fibre board or the like, it should be provided with a sufficient number of perforations 5 to give the required cohesion between tread and carcass. This sheet is illustrated in Fig. 4.

As shown in Fig. 7, the neutralizer may consist of an unslotted, imperforate sheet 7, which will serve the purpose of giving a separable juncture between the tread and the balance of the tire. This element 7, as well as the neutralizer strips 3 and the perforated sheet 4, may be given a coating of rubber composition prior to application upon the carcass 1, but this is not essential.

While the imperforate neutralizer 7 will serve the purpose of holding the tread 2 in place during all ordinary use, I prefer to have the neutralizer either perforated or in the form of strips 3, because giving more positive results for all kinds of conditions of use and abuse.

Similarly, the wear resisting member or tread 10 is applied to the balance 11 of a heel, a thin sheet 12 suitably perforated, as at 13, being molded between the members 10, 11. As shown in Fig. 5, the neutralizer element 12 has practically all its perforations near its edge, but this is not essential. When the rubber members 10 and 11 are thus molded together, with the neutralizer 12 between, the tread 10 can at any time be forcibly stripped off from the heel portion 11, and a new tread applied. The advantage of this is that it enables the shoe manufacturers to ship the heels complete, while at the same time permitting the shoes to be easily re-heeled at any time.

While this present application covers the process of forming articles with removable wear-resisting parts, my companion application filed July 1, 1920, Serial No. 393,459, is designed to cover the structure, particularly as applied to heels and treads of boots and shoes. An even more perfect form of the sole and heel in which this process is employed is set forth in another companion application filed July 12, 1920, Serial No. 395,752.

Although I have described thin fibre board as best adapted for use as a neutralizer, I also design to use a fabric, such as tire-duck; apply rubber composition to both surfaces thereof, and then partially cure it before applying it to the carcass 1. This semi-cure will prevent the same from fully vulcanizing itself and the tread and carcass together, in a manner to prohibit free stripping, while it will vulcanize together sufficiently to hold the parts against separation due to use. This semi-cured fabric neutralizer may be used in a perforated condition, or imperforate, as described for the fibre-board.

In retreading, the removal of the worn shoe will tear away more or less of the neutralizer from the carcass. I therefore take off all the remaining neutralizer before applying the new shoe. This new shoe or tread is preferably made with a gum-coated fresh neutralizer built in its inner periphery, so that the combined tread and neutralizer can be applied as one and in a well known manner. It is obvious that this facilitates retreading, in that the new shoe and the neutralizer are applied as a unit, but I do not restrict myself to this system, as the neutralizer may be applied directly upon the old carcass in the same manner as above described for a new one.

It should be noted that a sheet of fibreboard introduced between the shoe and carcass as a neutralizer, or introduced within the carcass itself, will serve most effectively to prevent puncture of the inner tube.

What I claim is:

1. The herein described process of detachably uniting two rubber surfaces, which consist in vulcanizing one rubber surface to the other at numerous closely disposed areas separated by numerous closely disposed areas incapable of cohesion, whereby the surfaces can at will be stripped from each other.

2. The herein described process of detachably uniting two rubber surfaces, which consists in vulcanizing one rubber surface to the other in parallel lines separated by parallel lines incapable of cohesion.

3. The herein described process of detachably uniting two rubber surfaces, which consists in applying a number of narrow strips relatively close together upon one surface and vulcanizing the other surface thereto, so that said surfaces adhere to each other solely between the strips at a plurality of narrow areas, and are therefore readily detachable from each other.

In testimony that I claim the foregoing invention, I have hereunto set my hand this 9th day of September, 1920.

LEON B. CONANT.